United States Patent [19]

Southam

[11] Patent Number: 5,670,095
[45] Date of Patent: Sep. 23, 1997

[54] TOWER PACKING UNIT

[75] Inventor: Dennis Owen Southam, 8 James Street, Port Bourghton, Australia, 5522

[73] Assignees: Jeffrey John Baumont, Singapore; Julian Morris Higgs, Victoria; Dennis Owen Southam, Port Broughton, both of Australia

[21] Appl. No.: 491,990

[22] PCT Filed: Jan. 18, 1994

[86] PCT No.: PCT/AU94/00024

§ 371 Date: Jul. 17, 1995

§ 102(e) Date: Jul. 17, 1995

[87] PCT Pub. No.: WO94/16810

PCT Pub. Date: Aug. 4, 1994

[30] Foreign Application Priority Data

Jan. 19, 1993 [AU] Australia ................ PL6864

[51] Int. Cl.[6] .......................... B01J 19/30
[52] U.S. Cl. .................. 261/97; 261/94; 261/110; 261/DIG. 72
[58] Field of Search ................ 261/94, 97, 110, 261/DIG. 72

[56] References Cited

U.S. PATENT DOCUMENTS

| 3,752,452 | 8/1973 | Doyne. | |
|---|---|---|---|
| 4,086,307 | 4/1978 | Glaspie | 261/DIG. 72 |
| 4,203,935 | 5/1980 | Hackenjos. | |
| 4,425,285 | 1/1984 | Shimoi et al. | 261/DIG. 72 |
| 4,575,435 | 3/1986 | Kuhl | 261/DIG. 72 |

FOREIGN PATENT DOCUMENTS

| 27 39 236 | 8/1977 | Germany. |
| 674-774 | 7/1979 | U.S.S.R.. |
| 374707 | 7/1932 | United Kingdom. |

OTHER PUBLICATIONS

"Plastic Jaeger Tri-Packs High Performance col. Packing", Product Bulletin, Aeger Products, Inc.

*Primary Examiner*—Khanh P. Nguyen
*Attorney, Agent, or Firm*—Gary M. Nath; Nath & Associates

[57] ABSTRACT

A tower packing unit for a liquid/gas/miss contact apparatus including a plurality of filaments that form a central body and a perimeter ring surrounding and connected to the central body; wherein the perimeter ring is formed in a continuous wave configuration surrounding the central body.

10 Claims, 3 Drawing Sheets

TOWER PACKING UNIT

BACKGROUND OF THE INVENTION

1. Field of the Invention

The present invention relates to a tower packing unit, and in particular to tower packing unit that may be used for liquid/gas (mist) contact apparatuses.

2. Discussion of the Prior Art

The tower packing unit according to this invention is generally used in air pollution control equipment. Such equipment generally operates as a result of contact between differing phases, most significantly gas/mist and liquid. The equipment is useful for the absorption and desorption of gas, mist and the separation of solid and liquid particulates and the like, that may be emitted from effluent columns or towers.

Pollution control equipment for which the present invention is relevant in general works by offering one phase, usually a liquid, to another phase, usually a gas or mist. Effective pollution control is gained if the surface of the liquid is constantly renewed. The incorporation of a plurality of tower packing units or such like into such pollution control equipment assists in renewing fresh liquid surface. The constant renewing or offering of fresh liquid allows for the most efficient mass/heat transfer between the phases to occur, with the least expenditure of energy. The mass/heat transfer efficiency for random packing is determined more by its ability to provide fresh liquid surface, rather than total liquid surface that may be provided.

Maximum fresh liquid surface is achieved by providing the maximum number of collection, or holdup points for droplets of the liquid without significant disruption to the flow of gases/mist. A holdup point occurs where a droplet of liquid is momentarily held up when passing through the system. When a single droplet is held up, an agglomeration and mixing of droplets converging at a single hold up point, builds up the droplet until the weight of the liquid exceeds the surface tension and the droplet falls onto the next section of packing, breaking up and exposing fresh liquid surface in the process. Continuation of this process results in a continuous rejuvination of fresh liquid.

Tower packing units are used to increase the number of holdup points available within an effluent tower. The number of holdup points, particularly for a liquid stream, is to a certain extent determined by the configuration of the tower packing unit. Holdup points are usually created by filaments forming the structure of a tower packing unit, and/or nodules that intermitently project from the filaments of a particular tower packing unit. A droplet will usually form on the extremity of a particular nodule or from the filament itself.

Holdup points are also created by the interaction between a number of tower packing units. Thus a holdup point is created where two such units contact each other. Such contact, although beneficial in creating additional holdup points, creates the disadvantage of blocking the fluid flow as it allows large droplets to form and as a consequence increasing the pressure drop through the system. As a result, it is desirable to minimize contact between tower packing units.

Such tower packing materials are available in various sizes and shapes, usually designed to bring a gas or mist and a liquid, into intimate contact. Such packing material may consist of a spherical body having a lattice work jacket formed around a circular ring with extending arcuate bars, such as described in U.S. Pat. No. 4,203,935. Another such unit is described in U.S. Pat. No. 3,752,453 which describes a unit having 6 to 12 turns of a helix arranged about a circle and having the ends joined to form a torus. The helix each contain one or more projections.

The difficulty with such tower packing is to provide an item that will maximize the number of holdup points per surface area of each unit and per unit volume within a tower in order to maximize the mass and heat transfer efficiency without a substantial pressure drop being involved.

SUMMARY OF THE INVENTION

It is an object of the present invention to overcome or at least alleviate one or more of the difficulties associated with the prior art, increasing the efficiency in the absorption/desorption of pollutants in a gas/mist effluent, by continuously rejuvenating liquid from an oncoming liquid stream by using a plurality of units that are placed in a bed within such a tower. The arrangement of the filaments and nodules of each particular unit, increases the rate of rejuvenation of the liquid by providing on increased number of holdup points per unit area, while minimizing the resultant pressure drop of the effluent gas.

It is another object of the invention to use large numbers of packing units within an effluent tower.

It is a further object of the invention to have the filaments on each particular unit that have a wave configuration so as to surrounding a central body.

It is still another object of the invention to provide units having a sinusoidal wave configuration.

These and other objects of the invention will be readily understood from consideration of the specification, claims and drawings.

BRIEF DESCRIPTION OF THE DRAWINGS

It will now be convenient to describe the invention with reference to the accompanying drawings. It should be understood that these drawings are merely illustrative of the present invention and the particularity of the drawings should not limit the generality described herein.

DETAILED DESCRIPTION OF THE PREFERRED EMBODIMENT

Figure 1:
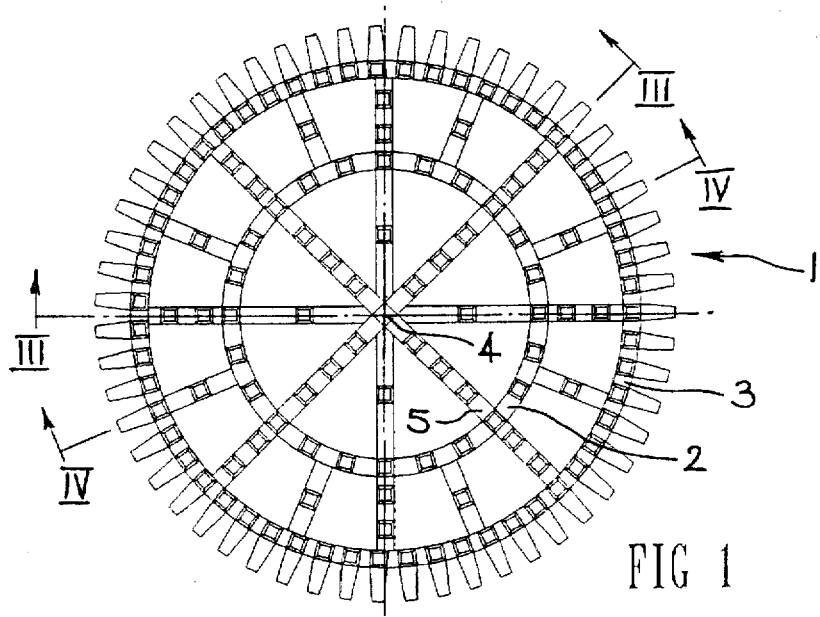
FIG. 1 illustrates a top plan view of a tower packing unit in accordance with the present invention.
Figure 2:
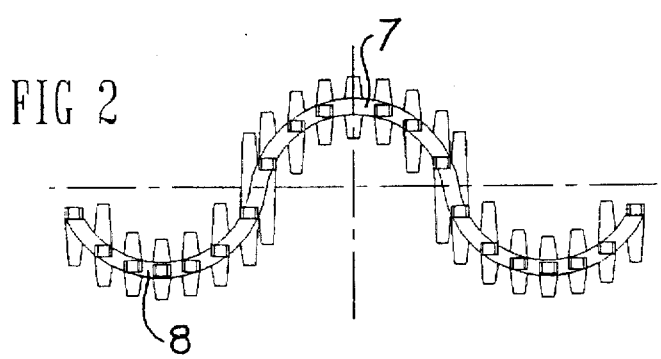
FIG. 2 illustrates a cutaway section of a sinusoidal perimeter ring.
Figure 3:
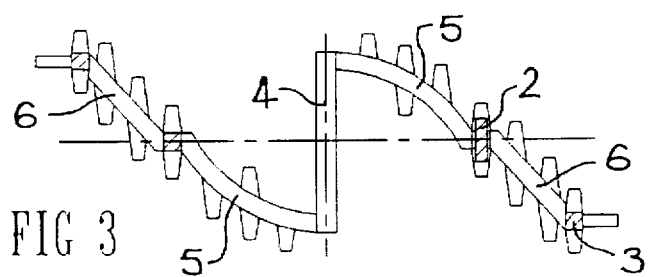
FIG. 3 illustrates a partial cross-section along line III—III of FIG. 1.
Figure 4:
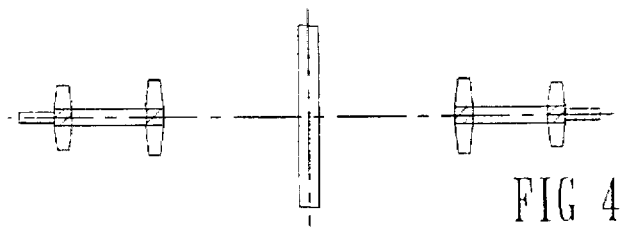
FIG. 4 illustrates a partial cross-section along line IV—IV of FIG. 1.
Figure 5:
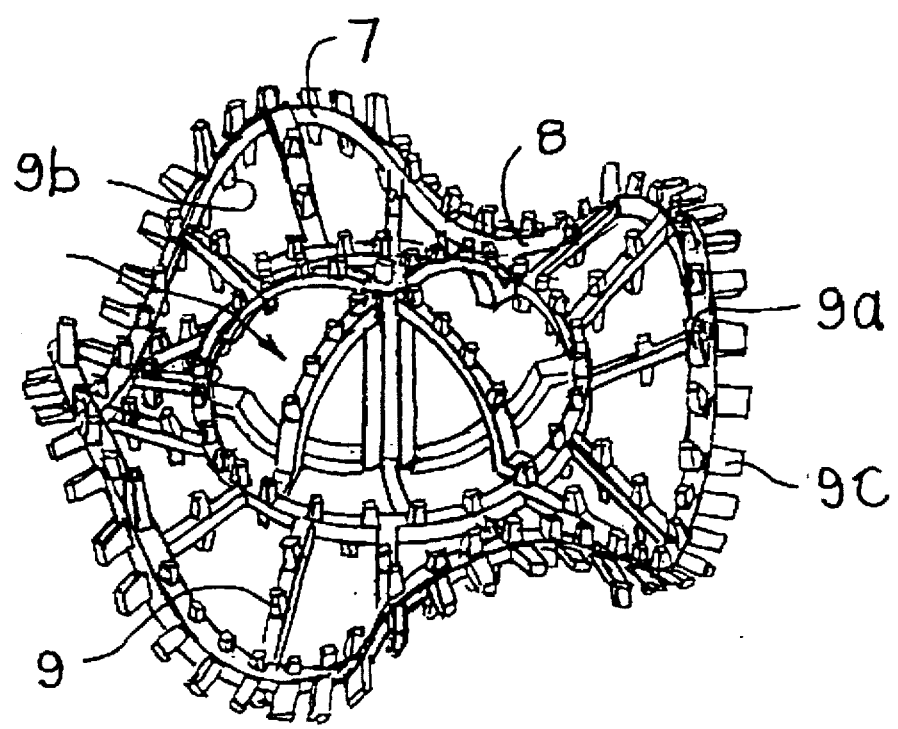
FIG. 5 illustrates a perspective view of a tower packing unit in accordance with the present invention.
Figure 6:
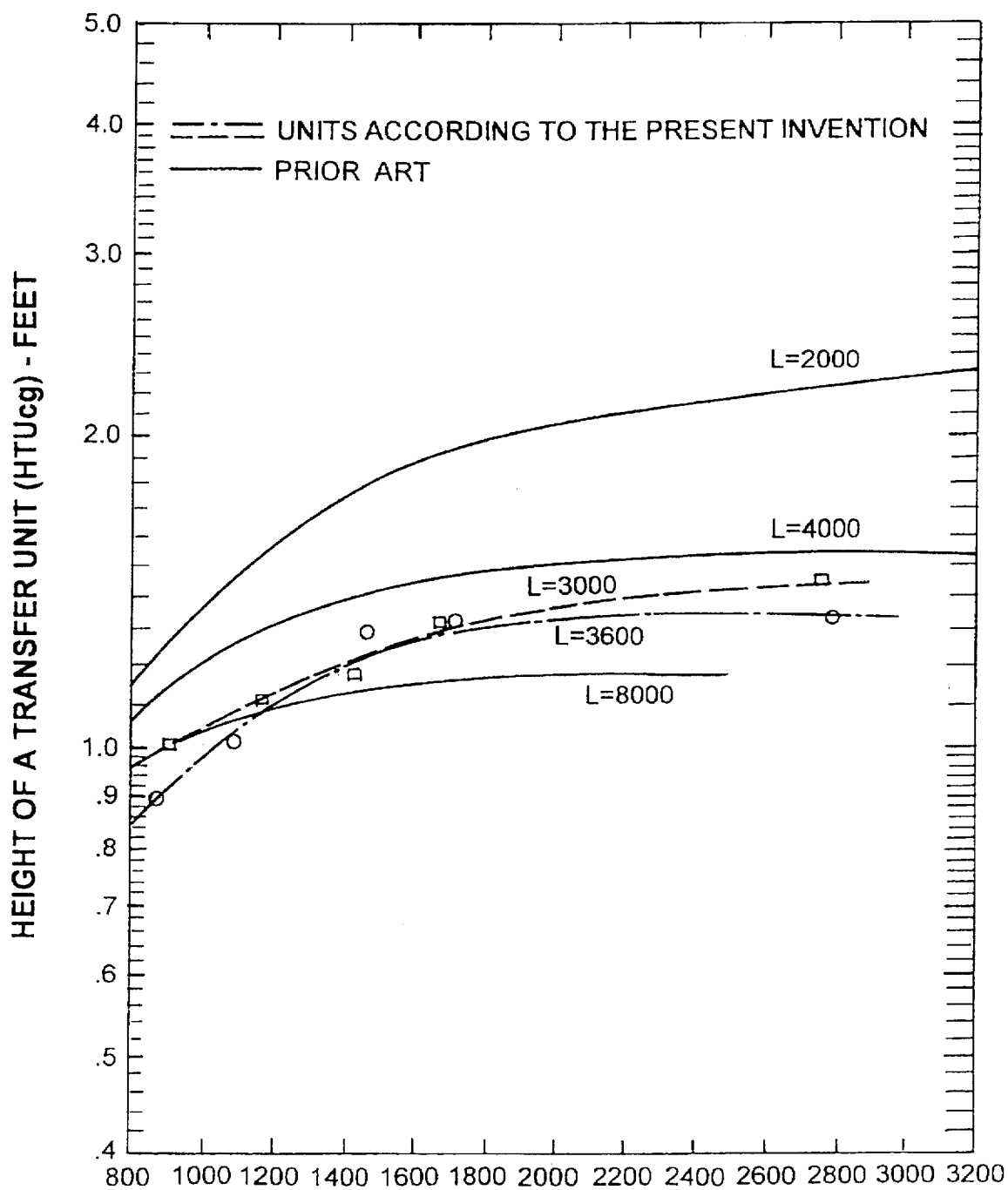
FIG. 6 illustrates comparative test results of a tower packing unit in accordance with the invention and prior art units.

From the view of the tower packing unit 1 as illustrated in FIG. 1, the relationship between the filaments of the central ring 2 and a sinusoidal perimeter ring 3 is demonstrated.

Although it is desirable to ensure that the total length of the filaments is sufficient to maximise droplet holdup points, it is also desirable to ensure that the filaments are spaced sufficiently apart to minimize disruption to the gas pressure through the system. The arcuate filaments are so arranged to space the central ring from the central axis, and connecting filaments extend from the central ring to space the perimeter ring from the central body region. This allows for a sufficient passage for gas/mist to pass through a bed of units, to minimize disruption to the gas/mist flow and the pressure drop through the system.

Each of the filaments of the tower packing unit effectively act as a holdup point, however each filament also includes a number of spaced nodules protruding from the surface of each filament providing additional holdup points. Each of the filaments is most preferably formed having sharp angles so as to allow droplets to form upon them. Most preferably, the filaments and the nodules have a square cross section. The combination of the filaments and the nodules provides hold up points, for example, for a passing liquid stream, allowing the formation of droplets to form upon them. It is the formation and subsequent dropping and break-up of such droplets that provide rejuvenated liquid to meet an oncoming gas/mist stream within a particular effluent column or tower.

The spaced nodules are also designed to act as holdup points for fluid that is passed through a bed system. It is evident that the number of nodules is dependent upon the total length of filament available, and the configuration of the filaments. With the particular arrangement of the packing unit, the balance between maintaining sufficient holdup points, without disruption to the effluent flow of gases is maximised. The configuration ensures that there is constant renewing of fresh liquid available, enabling an efficient mass/heat transfer between gas/mist/liquid phases, and reducing the number of units required and/or the actual height of effluent tower required.

The spaced nodules are generally arranged in an ordered manner around the filaments. Most preferably the nodules surrounding the perimeter ring project both above and below the ring and laterally outward from the ring. The nodules surrounding the connecting filaments, the arcuate filaments and the central ring may also project in more than one direction from the filament.

The nodules should be spaced so as to maintain the number of holdup points that can be formed on the filaments of a tower packing unit at a maximum. This is achieved by ensuring that there is sufficient space between each nodule so as to allow the formation of individual droplets on the extremity of each nodule. Preferably, the nodules should be from 2 to 8 mm apart and from 2 to 12 mm in length.

Preferably, the spherical central body region includes 4 arcuate filaments evenly spaced around the central ring and meeting at the top extremity of the central axis. Four corresponding arcuate filaments may be positioned radiating in the opposite hemisphere from the central ring and meeting at the bottom extremity of the central axis. These arcuate filaments preferably are offset, and evenly spaced from the corresponding opposite arcuate filaments in order to provide the maximum available holdup points for a passing liquid stream, while still allowing sufficient gas/mist to pass through the system.

Generally, the connecting filaments spacing the perimeter ring from the central ring are evenly spaced around the central and perimeter rings and extend above and below the central ring.

The preferred sinusoidal wave configuration of the perimeter ring, includes a series of peaks and troughs that extend to the same level as the top and bottom extremity of the central axis. Although the precise level of the peaks and troughs is not essential to the invention, it is preferred that it is at least approximately the same level as the central axis to maximize the total length of filament available per volume occupied by a particular unit.

The unique configuration of the present invention provides a maximum number of holdup points per unit area while maintaining a balance so as to not substantially impede the flow of gases (mist) through the system. This may have been achieved by maximising the total length of filament and number of nodules available per unit volume, without the detrimental affect of increasing the number of contact points between neighboring units, when a plurality of units are used in an effluent tower, and maintaining a sufficient distance between filaments to minimize the obstruction to passing gas/mist.

It has also been found that such a tower packing unit is structurally sound, and can be readily moulded as a single integral unit. The tower packing unit can be made from any suitable material, such a resilient and wetable plastics material, most suitably, polyethylene, polypropylene, P.V.C. or nylon.

FIG. 2 illustrates the configuration of the sinusoidal perimeter ring, having peaks 7 and troughs 8, when the unit is considered to be in a horizontal plane.

The central ring 2 surrounds a central axis 4 and is connected to the central axis by arcuate filaments 5. The central axis has a top extremity (4*a*) and base extremity (4*b*) as illustrated in FIG. 3. The arcuate filaments extend to the central ring from both the top and base extremity of the central axis, as illustrated in FIG. 3.

FIG. 3 best illustrates the relationship between the central axis 4 and the arcuate filaments 5 leading to a cross section of the central ring 2. The square cross section of the filaments is evident from this figure. FIG. 3 also illustrates the connecting filaments 6 that extend from the central ring 2 to the sinusoidal perimeter ring 3 (shown in cross section). The connecting filaments are relatively straight and as is illustrated in FIG. 3 the connecting filaments extend above and below the central ring filament.

The relationship between the respective components is better illustrated in FIG. 5. The central ring and the arcuate filaments tend to form a spherical arrangement 10. The peaks 7 and troughs 8 in the sinusoidal perimeter ring extend to the same level as the top and base extremity of the central axis.

Nodules on the sinusoidal perimeter ring project above (9*a*) and below (9*b*) and laterally outward (9*c*) from the plane of the tower packing unit. Nodules 9 also project above and below the other filaments of the unit.

FIG. 6 illustrates graphed results from an effluent transfer unit, utilizing tower packing units according to the present invention and those according to the prior art (2k Tellerette), in an ammonia/air/water counter current flow system. The graph illustrates the improved performance of the tower packing units of the present invention above those of the prior art, as is illustrated by the lower tower height requirement given comparable conditions.

The tower packing unit of the present invention maximizes the total length of the filaments per unit area, and as a result, the number of available nodules, ensuring sufficient holdup points to provide constant renewing of the liquid surface. This produces an efficient mass/heat transfer between phases without significant disruption to the flow of gases/mist through the system. Such an arrangement minimizes the expenditure of energy by reducing the pressure drop that may occur when utilized in an emission control system.

It should be understood that the above description is merely illustrative of the present invention and the invention includes any modification or alterations to the invention that does not depart from the spirit or ambit as described herein.

We claim:

1. A tower packing unit for a liquid, gas and/or mist contact apparatus including a plurality of filaments comprising;
   a central body; and
   a perimeter ring surrounding and connected to the central body;
   wherein the perimeter ring is formed in a continuous wave configuration surrounding the central body.

2. A tower packing unit according to claim 1 wherein the wave configuration is a sinusoidal wave configuration.

3. A tower packing unit according to claim 2 wherein the filaments include a plurality of spaced nodules protruding from a surface of the filaments.

4. A tower packing unit according to claim 1 wherein the filaments that form the central body are arranged in a substantially spherical shape, said filaments include;
   a central axis have a top and base extremity;
   a central ring surrounding and in a plane substantially perpendicular to the central axis; and
   a plurality of arcuate filaments, connecting the central axis and the central ring.

5. A tower packing unit according to claim 4 wherein the central body includes a set of four evenly spaced arcuate filaments extending from the top extremity of the central axis and a second set of four evenly spaced arcuate filaments extending from the base extremity of the central axis and connecting to the central ring;
   each of said first and second set of filaments is offset so as to be in an evenly spaced arrangement around the central ring.

6. A tower packing unit according to claim 5 wherein the perimeter ring is connected to the central ring by a plurality of evenly spaced connecting filaments.

7. A tower packing unit according to claim 6 wherein the perimeter ring has peaks and troughs, said peaks extending to the level of the top extremity of the central axis and said troughs extending to the level of the base extremity of the central axis.

8. A tower packing unit according to claim 3 wherein the nodules extending generally upwardly and downwardly form each of the filaments, as well as laterally outward from the perimeter ring.

9. A tower packing unit according to claim 8, wherein the nodules and filaments have a square cross-section, providing edges which allow a buildup of droplets to form on said edges.

10. A tower packing unit according to claim 9, wherein the nodules are spaced from 2 to 8 mm apart and sufficiently spaced to allow a buildup of droplets on each nodule.

* * * * *